United States Patent [19]
Goldberg

[11] 3,966,001
[45] June 29, 1976

[54] PLATFORM WEIGHING SCALE

[75] Inventor: Arthur Goldberg, Fort Lee, N.J.

[73] Assignee: Howe Richardson Scale Company, Clifton, N.J.

[22] Filed: Dec. 18, 1974

[21] Appl. No.: 534,086

[52] U.S. Cl. ............................ 177/128; 177/133; 177/253
[51] Int. Cl.² ...................................... G01G 21/00
[58] Field of Search ........................ 177/132–135, 177/128, 211, 253, 255, 260

[56] References Cited
UNITED STATES PATENTS

| | | | |
|---|---|---|---|
| 2,962,275 | 11/1960 | Thurston | 177/211 |
| 3,091,961 | 6/1963 | Piell | 73/141 A |
| 3,123,166 | 3/1964 | Schellentrager | 177/132 X |
| 3,266,585 | 8/1966 | Boadle | 177/211 X |
| 3,565,196 | 2/1971 | Laimins | 177/211 |

*Primary Examiner*—Joseph W. Hartary
*Attorney, Agent, or Firm*—Norris & Bateman

[57] ABSTRACT

A platform weighing scale having a load receiving platform structure positioned over and resting on a multiplicity of load cells and having a load cell-removing aperture in registry with each load cell whereby each load cell is upwardly removable through its associated load cell removal aperture.

3 Claims, 8 Drawing Figures

3,966,001

PLATFORM WEIGHING SCALE

FIELD OF INVENTION

This invention relates to weighing apparatus and is especially concerned with platform weighing scales.

BACKGROUND

A problem experienced with platform scales of the type which supports the platform on inboard load cells is the difficulty in removing a defective load cell for repair or replacement.

SUMMARY AND OBJECTS OF INVENTION

A major object of this invention is to provide a novel construction for easily removing inboard platform-supporting load cells.

The foregoing object is accomplished by detachably securing a force-transmitting or transferring member in an aperture or opening which is formed through the platform and by so arranging the load cell beneath the force transfer member that its force receiving element is engaged by the force transfer member to receive the load-induced force which is transferred by the force transfer member. The force transfer member is upwardly removable from the top of the platform so that upon removing it, the load cell may be withdrawn upwardly through the platform aperture which is made large enough to pass the cell.

To reduce the ground-to-platform height of a low profile scale incorporating the principles of this invention, the foregoing force-transfer member is formed with a downwardly opening well which receives the load cell button or force-receiving nose of the load cell. In this manner, the load cell button is nested at least partially within the force transfer member which preferably has a relatively short axial length.

In the preferred embodiment of this invention the above-mentioned force-transfer member is a leveling element such as an externally threaded screw which is threaded in the load cell-removal aperture and which is selectively axially displaceable. With this construction each load cell-supported corner of a rectangular platform may independently be raised or lowered to level the platform and thereby accommodate the installation of the scale on an uneven floor or other uneven support surface. Additionally, adjustment of the leveling screws serve to uniformly distribute the scale's dead load which is carried by the platform-supporting load cells.

In this invention, therefore, the leveling screws or other equivalent, axially displaceable members are each effective to facilitate the removal of the load cells, to adjust the level of the platform, to adjust the distribution of dead load on the load cells, and to transfer the weight of an applied load from the platform to the load cells.

It will be appreciated that the combined leveling and load cell removal construction described above is advantageously applicable to load cell platform scales other than the low profile type.

Thus a further object of this invention is to provide a novel platform scale construction in which a selectively displaceable member provides for the transfer of force from the load-receiving platform to the load cell, is selectively removable to effect the removal of the load cell, and is adjustable to level the platform.

DETAILED DESCRIPTION

Figure 1:
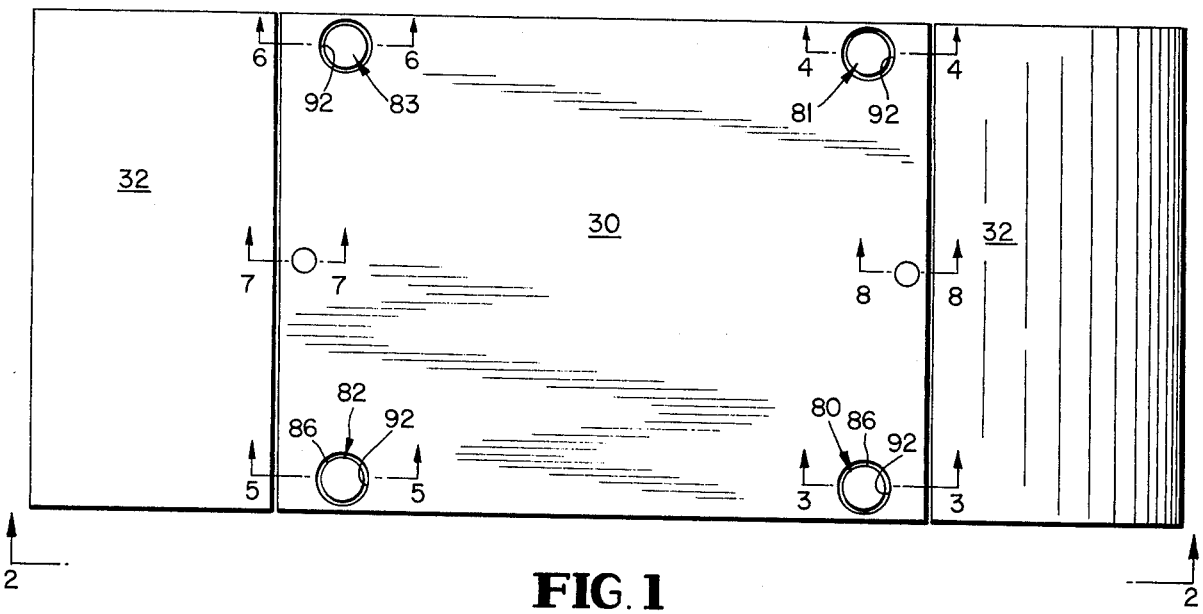
FIG. 1 is a plan view of a low profile type platform scale which incorporates the principles of this invention.
Figure 2:
FIG. 2 is a side elevation of the scale assembly shown in FIG. 1 as seen from lines 2—2 of FIG. 1.
Figure 3:
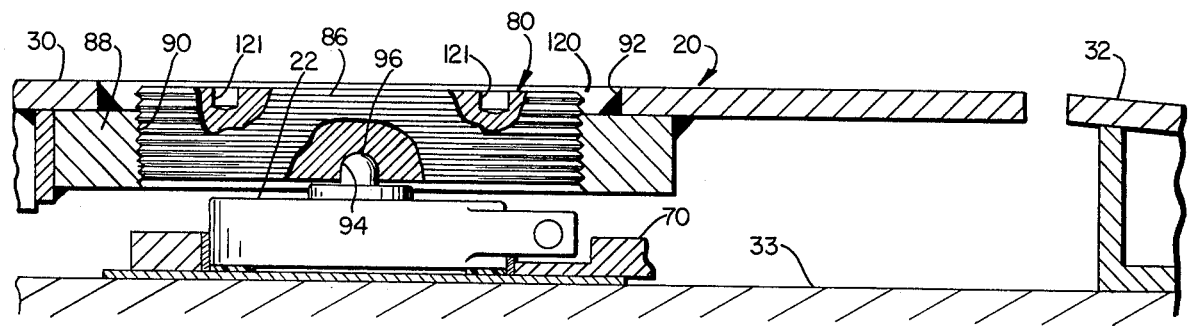
FIG. 3 is a section taken substantially along lines 3—3 of FIG. 1.
Figure 4:
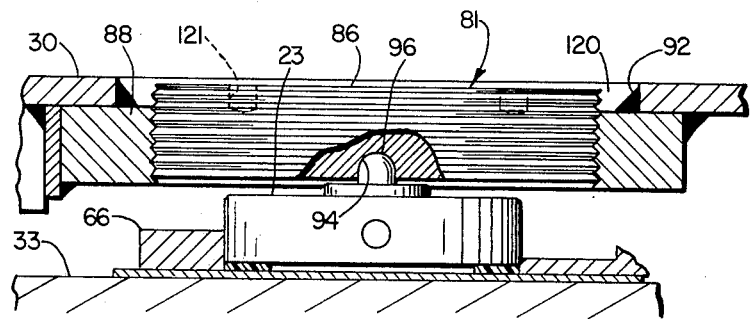
FIGS. 4 and 5 are sections respectively taken substantially along lines 4—4 and 5—5 of FIG. 1.

Referring to drawings and particularly to FIGS. 1–6, the platform weighing scale incorporating the principles of this invention comprises a platform or deck structure 20 and platform-supporting load cells 22, 23, 24 and 25.

In the illustrated embodiment structure 20 comprises a rectangular load-receiving platform or deck 30 which is formed by a suitable structural plate and which is directly supported at each corner by one of the load cells 22–25. For the pitless installation shown in FIGS. 1 and 2, a ramp structure 32 provides access to platform 30. Although a rectangular platform is shown in the illustrated embodiment, it will be appreciated that the various features of this invention may be employed with different platform configurations if desired.

Structure 20 rests upon load cells 22–25 which are inboard of and hence vertically beneath platform 30. In this embodiment, each load cell 22–25 is restrained against horizontal movement relative to platform 30. The scale support surface is indicated at 33 in FIG. 2. Load cells 22–25 may be of any suitable type. For application in low profile platform scales load cells 22–25 may be of the conventional pancake compression type which is responsive to an applied load to produce a d.c. signal voltage whose magnitude is a function of the weight of the load. The overall height of such pancake type load cells generally ranges from about 1 inch to about 1⅜ inches. Other types of load cells or transducers, such as hydraulic load cells, may be utilized with this invention. If desired, an unshown system may be employed to restrain horizontal movement of the assembly of load cells 22–25 and platform structure 20.

If desired, retainers, such as those indicated at 60, 66 and 70, may be employed for all or selected ones of load cells 22–25. In this embodiment, load cells 22–24 are removably seated in upwardly opening apertures or openings in retainers 60, 66 and 70 respectively. The previously mentioned, unshown horizontal restraint system, if employed, may be connected to retainers 60, 66 and 70 to restrain horizontal motion of the assembly of the load cells and platform structure 20.

An example of such a horizontal restraint system is described in United States patent application Ser. No. 534,087 filed on even date herewith for LOW PROFILE PLATFORM WEIGHING SCALE, and assigned to the asignee of the instant application.

Figure 5:
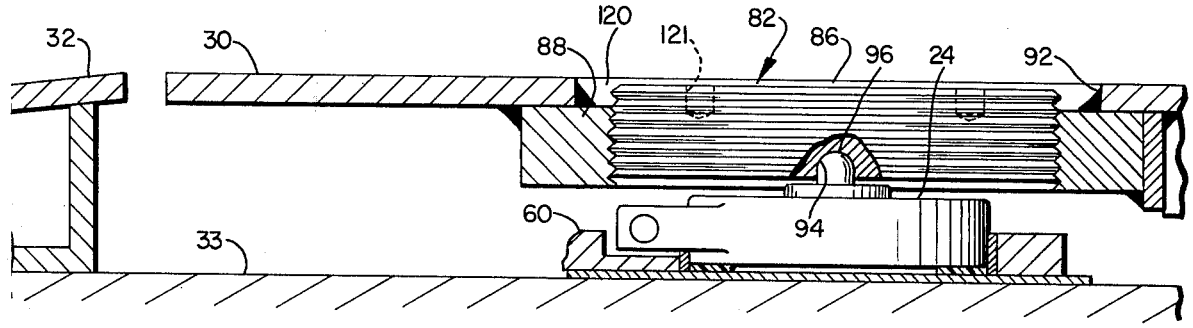
Figure 6:
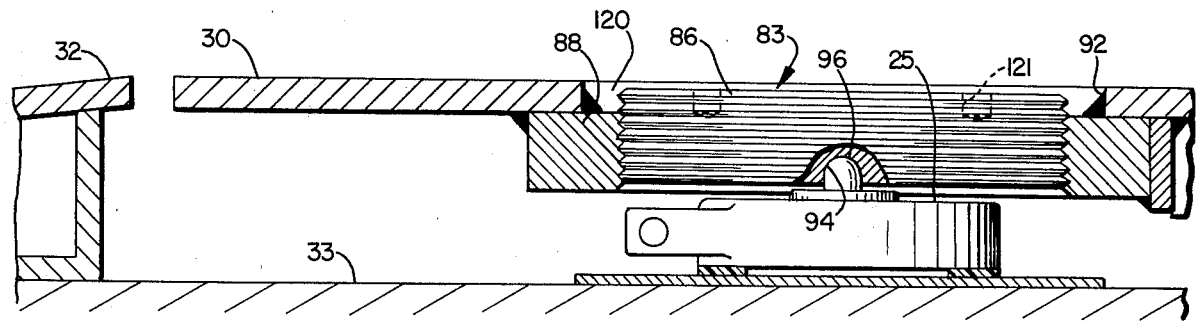
FIG. 6 is a section taken substantially along line 6—6 of FIG. 1.

In this embodiment, the force attributable to a load on platform 30 is transferred to load cells 2–25 respectively by load cell removal assemblies 80, 81, 82 and 83 (see FIG. 1). Assembly 80, as shown in FIG. 5, comprises an externally threaded leveling screw 86 and a leveling screw retainer block 88. Retainer block 88 is rigidly fixed to the underside of platform 30 as by welding and has an internally threaded through bore 90. Bore 90 is in axial alignment with an aperture 92 which is formed through platform 30.

Leveling screw 86 is threaded into bore 90 and is coaxially formed with a downwardly opening well 94 which interfittingly receives the load cell button 96 of load cell 22. A close clearance is provided between load cell button 96 and the sidewall of well 94. Load cell button 96 seats against the closed inner end of well 94 and is nested and thus captured in well 94 to reduce the floor-to-platform height of the scale.

With this construction, force attributable to the weight of the load on platform 30 is transferred through retaining block 88 and leveling screw 86 to the force-receiving load cell button 96. The reception of load cell button 96 in well 94 confines load cell 22 against horizontal displacement relative to platform 30.

Assemblies 81-83 are of the same construction as that just described for assembly 80. Accordingly, like reference numerals have been applied to designate like parts of assemblies 81-83.

As shown in FIGS. 3-6 each retaining block 88 cooperates with the aperture-defining wall of platform 30 to define a shallow recess or well 120 which receives the head of leveling screw 86 so that the top face of screw 86 is at a level which is lower than the flat load-receiving surface of platform 30.

The diameter of each bore 90, as well as the diameter of each aperture 92, is larger than the greatest dimension of each load cell 22-25 in a horizontal plane to facilitate the convenient removal of each load cell upwardly through its associated bore 90 and apreture 90 upon the removal of the leveling screw 86.

The top end wall of each leveling screw is advantageously formed with suitable non-circular sockets 121 for receiving a suitable tool to selectively thread leveling screw 86 up and down in bore 90. With this construction, each leveling screw may be threaded upwardly to remove it from the platform structure which comprises the assembly of platform 30 and retaining blocks 88. After the leveling screw is removed, each load cell (22-25) may easily be removed from the scale simply by lifting it upwardly through bore 90 and aperture 92. Each of the load cells 22-25 is therefore conveniently removable in this fashion for repair or replacement without having to jack up or lift the platform and without requiring the removal of any part other than the leveling screw itself.

In addition to providing the load cell-removal capability, each leveling screw 86 is selectively threadable up and down in bore 90 to raise or lower its associated corner of platform 30. In this manner, leveling screws 86 are adjustable to level platform 30 and thus facilitate the installation of the scale on an uneven floor or other scale support surface.

Additionally, the scale's dead load carried by each of the load cells 22-25 is individually and selectively adjustable by selectively threading the leveling screws 86 up or down. The dead load carried by load cells 22-25 is the weight of platform structure 20.

From the foregoing it will be appreciated that leveling screws 86 each perform multiple functions. First, they each provide for the transfer of load-induced force from platform 30 to load cells 22-25. Second, they are each removable to facilitate the removal of load cells 22-25 from the scale. Finally, they are each selectively adjustable to level platform 30 and also to adjust the dead load carried by each load cell.

The foregoing novel construction for facilitating the removal of load cells 22-25 and/or leveling platform 30 may also be employed in load cell platform scales which are not of the low profile type.

If desired, a pair of platform-clamping and anti-tipping assemblies 122 (FIG. 7) and 123 (FIG. 8) may be employed. Assemblies 122 and 123 are effective to restrain platform 30 against tipping when a load is so positioned on platform 30 that its weight is not uniformly distributed among load cells 22-25. For example, a load applied at any one of the corners of platform 30 will tend to tip platform structure 20 because it merely rests on the force-receiving elements or buttons of load cells 22-25 and is not vertically fixed to cells 22-25 or any other part. Additionally, assemblies 122 and 123 are each selectively manipulatable to rigidly clamp platform assembly 20 in place to prevent it from tilting or falling down upon removing any one of the load cells 22-25.

Figure 7:
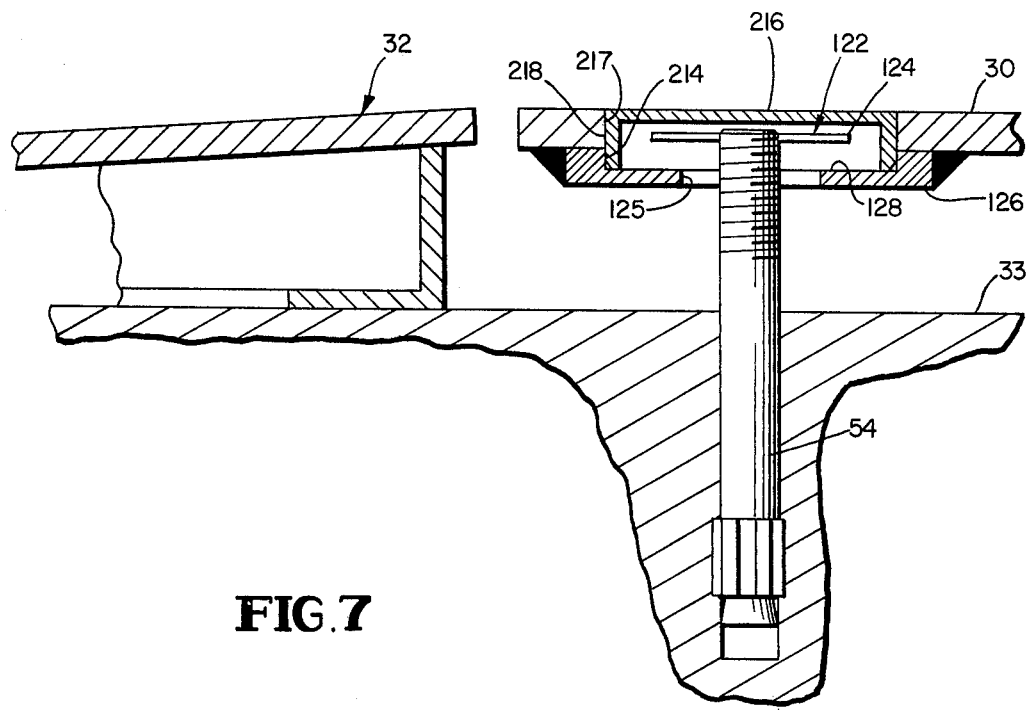
FIG. 7 is a section taken substantially along line 7—7 of FIG. 1.

As shown in FIG. 7, assembly 122 includes an anchor bolt 54 (which may be of the masonry type) and a suitable snubber or bumper member which may be in the form of an internally threaded washer 124. The upper end portion of anchor bolt 54, which is threaded, coaxially extends through a circular aperture or bore 125 in a support ledge 126 and partially through a circular aperture 127 which is formed through platform 30. Support ledge 126, which is welded or otherwise rigidly joined to deck 30 on the underside thereof, may be formed from a suitable structural plate and is counterbored to form an annular shoulder 128 at the bottom of a recess 214. The uniformly diametered, cylindrically smooth side wall, which delimits recess 214, provides a smooth continuation of the aperture 127. A protective cap or cup 216 covers the upper end of anchor bolt 54 and provides a closure for the open upper end of aperture 127.

In normal use or operation of the scale, washer 124 is threaded on the upper end of anchor bolt 54 in such a manner that it is spaced vertically above shoulder 128 in the manner shown in FIG. 7. However, should an applied load tend to upwardly tip platform 30 in the region of assembly 122, shoulder 128 will seat against the flat bottom face of washer 124 to restrain tipping of platform structure 20.

Figure 8:
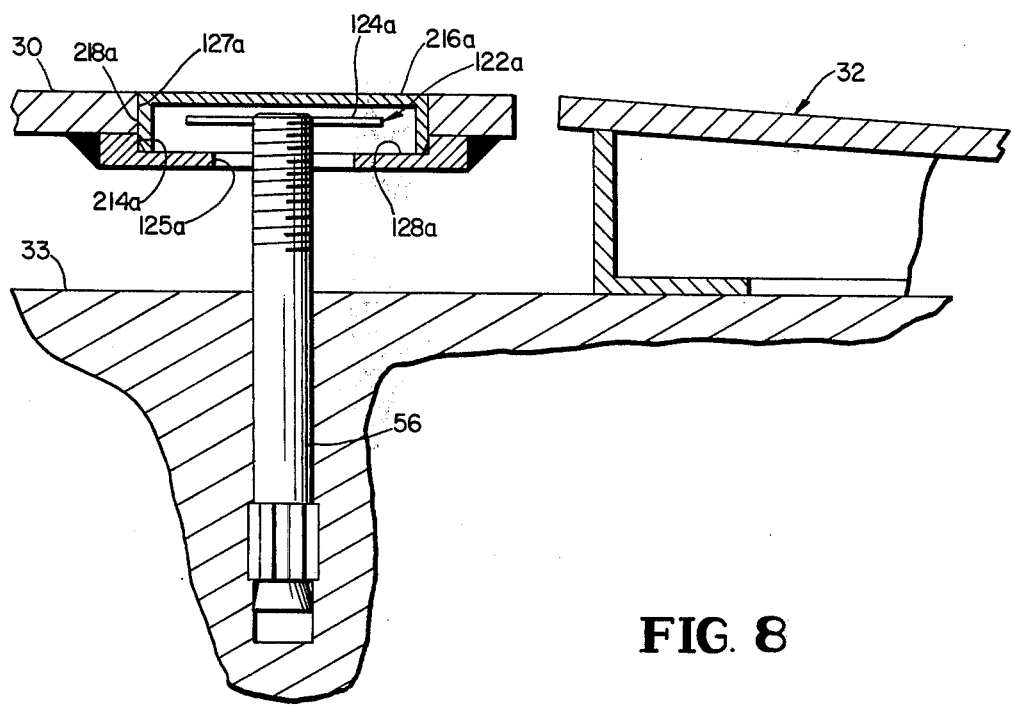
FIG. 8 is a section taken substantially along line 8—8 of FIG. 1.

As shown in FIG. 8, assembly 123, which is of the same construction as assembly 122, includes an anchor bolt 56 and a washer 124a. Associated with assembly 124 is a protective cap 216a and a support ledge 126a which are of the same construction as cap 216 and support ledge 126 respectively. Accordingly, like reference numerals suffixed by the letter "a" have been applied to designate like portions of support ledge 126a and cap 216a.

Cap 216a seats in and covers the circular aperture 127a which is formed through deck 30 and which corresponds to aperture 127. Thus, the construction and relationship of aperture 127a, assembly 123 and support ledge 126a are the same as that described for aperture 127, assembly 122 and support ledge 126.

Like washer 124, washer 124a is normally threaded on the upper end of anchor bolt 56 so that it is spaced vertically above and does not seat against shoulder 128a during normal use of the scale. Should an applied load tend to upwardly tip platform 30 in the region of assembly 123, shoulder 128a will seat against the bottom of washer 124a to restrict and restrain the tipping movement.

By selectively threading either or both of the washers 124 and 124a downwardly to positions where they firmly seat on shoulders 128 and 128a respectively, platform 30 will rigidly and vertically be clamped against movement between each washer and the rigid upper ends of the force-receiving elements or buttons of load cells 22–25. Thus, prior to the removal of any one of the load cells 22–25 either or both of the washers 124 and 124a may be tightly threaded down to firmly seat on shoulders 128 and 128a to rigidly clamp platform assembly 20 vertically in place, thereby preventing it from tilting or falling down when any one of the load cells 22–25 is removed.

The weight-representing output voltages developed by load cells 22–25 may be applied to a conventional circuit to provide a read-out of the weight of the load on platform 30. The weight read-out may be in digital form or in analog form.

If platform 30 tends to tilt when one of the load cells 22–25 is removed with this invention, it will be appreciated that structures other than assemblies 122 and 123 may be employed to restrain tipping. For example, a temporary support may be positioned beneath the corner at which the load cell is to be removed. Assemblies 122 and 123, however, are advantageous because of the previously mentioned reasons and because they are a unitary part of the scale assembly.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a platform weighing scale, a series of load cells, a load-receiving platform structure positioned over and resting on said load cells, said platform structure including a platform which has a load cell-removal aperture in registry with each load cell, and a force-transferring member removably positioned in each load cell-removal aperture to transfer the force due to the weight of a load on said platform to said load cells, each force-transferring member being seated on its associated load cell and threadedly engaged in its associated load cell-removal aperture for selective vertical displacement to adjust the level of the adjacent region of said platform, and each load cell being upwardly removable through its associated load cell removal aperture upon removal of the force transferring member from its associated load cell removal aperture.

2. The platform weighing scale defined in claim 1 wherein each force-transferring member is seated on the force-receiving element of its associated load cell and is formed with a downwardly opening well in which said force-receiving element is at least partially nested.

3. In a platform weighing scale, a load-receiving platform structure having a multiplicity of upwardly opening load cell removal apertures, a multiplicity of platform structure-supporting load cells arranged inboard of said platform structure, with each load cell being in registry with one of said apertures, and a multiplicity of externally threaded members threaded one into each of said apertures for selectively vertical displacement, said members being seated one on each of said load cells to support said structure on said load cells and to transfer load-induced forces from said structure to said load cells, each of said members being selectively upwardly removable from said structure, and each load cell being selectively upwardly removable through its associated load removal aperture upon the removal of the externally threaded member from its load cell removal aperture.

* * * * *